United States Patent [19]
Hsh

[11] Patent Number: 5,363,593
[45] Date of Patent: Nov. 15, 1994

[54] SYNTHETIC CULTIVATION MEDIUM AND ITS METHOD OF MANUFACTURE

[76] Inventor: Glint Hsh, 2 Fl., Ming Te Rd., No. 100, Taipei, Taiwan, Prov. of China

[21] Appl. No.: 928,324

[22] Filed: Aug. 12, 1992

[51] Int. Cl.$^5$ ............................................ A01G 31/00
[52] U.S. Cl. ........................................ 47/59; 47/58; 47/9
[58] Field of Search ................ 47/59, 9, 58; 8/101, 8/111

[56] References Cited

U.S. PATENT DOCUMENTS

| | | | |
|---|---|---|---|
| 4,421,598 | 12/1983 | Reeve | 162/88 |
| 4,919,842 | 4/1990 | Dickson et al. | 252/186.43 |
| 5,221,359 | 6/1993 | Kaupert | 134/26 |

FOREIGN PATENT DOCUMENTS

| | | | |
|---|---|---|---|
| 0273183 | 11/1989 | German Dem. Rep. | 47/9 |
| 8152416 | 9/1983 | Japan | 47/59 |
| 1227715 | 10/1986 | Japan | 47/59 |
| 2177828 | 7/1990 | Japan | 47/59 |
| 7809211 | 3/1979 | Netherlands | 47/59 |
| 0635923 | 12/1978 | U.S.S.R. | 47/59 |

*Primary Examiner*—Richard L. Raymond
*Assistant Examiner*—Deborah Lambkin
*Attorney, Agent, or Firm*—Jacobson, Price, Holman & Stern

[57] ABSTRACT

The present invention discloses a synthetic cultivation medium comprised of fibrous glomerates and a method for manufacturing the same. Absent a soil component, the synthetic cultivation medium is manufactured from scrap, man-made textiles, chiefly those made from polyacrylonitrile or polyester fibers. In manufacturing the cultivation medium, scrap textiles are shredded into short fibers and chemically refined and bleached. Prior or subsequent to the chemical refinement and bleaching, the short fibers are agitated into glomerates of intertwined fibers.

11 Claims, No Drawings

SYNTHETIC CULTIVATION MEDIUM AND ITS METHOD OF MANUFACTURE

BACKGROUND OF THE INVENTION

As a general principle, agricultural cultivation throughout history has been carried out on soil. In this regard, farmers generally preferred to select and/or transfer to plots of fertile land best suited for cultivation. However, even if starting on an agriculturally productive plot of farmland, prevailing weather condition and unpredictable environmental forces could cause crop production to decline or at least remain constant after consecutive years. In view of this, one of the many problems associated with conventional means of farming was that farmers had to frequently accommodate to a constantly changing natural environment.

Thus, the natural limitations of land fertility made it difficult to farm on the same plot for consecutive years. Farmers had to cultivate crops seasonally to accommodate prevailing soil and weather conditions. This staggered form of cultivation tended to destabilize and make uncertain the agricultural economy. These drawbacks, together with the ever increasing scarcity and continued depletion of arable land, has propelled searches for alternative, less resource exhaustive means of cultivation.

In light of the drawbacks of the conventional agricultural systems set forth above, the inventor, pulling from his vast experience gained through years of farming, observation and experiments, has sought feasible alternative means of cultivation. As a result, a synthetic cultivation medium—alternatively called "artificial soil"—has been developed. When this cultivation medium is used in conjunction with known hydroponic methods, the many disadvantages flowing from the traditional cultivation of plants on natural soil are substantially overcome.

The cultivation medium is comprised of chemically inert glomerates of intertwined fibers which are preferably manufactured from polyacrylonitrile fibers. Such fibers may be purchased commercially, but is more preferably recycled from scrap textiles or yarns. In this regard, the scrap textile is shredded, separated, refined, bleached with oxide, bleached for restoration, rinsed with water, dehydrated and dried. The processed fibers are then agitated to form small, relatively stable fiber glomerates Such a cultivation medium has many features and advantages: Resistance to decay, relative stability, tolerance to both acidity and alkalinity, insolubility in water, resistance to hardening, resistance to microbes, lightness, softness, puffiness and washability. The cultivation medium can be used for hydroponic plant cultivation by supplying suitable nutrients or may also be used to supplement and thus improve soil quality under traditional cultivation methods. In light of this, it is foreseen that this method and product will create new and tangible industries in the cultivation of plants.

DESCRIPTION OF THE INVENTION

The several features of the cultivation medium and its method of manufacture shall be explained hereunder in greater detail.

(A) The Manufacture of the Cultivation Medium

In general, the cultivation medium is manufactured from scrap or waste textiles, such textiles being made of man-made fibers. Preferably, the scrap textiles are made from polyacrylonitrile fibers. These fibers, as used in woven textiles, have characteristics analogous to that of silk.

To produce the cultivation medium, the scrap textiles are first finely shredded into short fibers. The length of the fibers will dictate the final diameter of the glomerates comprising the end product. In other words, a positive correlation exists between the fiber lengths and the diameters of the resulting fibrous glomerates. To achieve glomerates with diameters within the preferred range of 2 to 8 mms, the fiber length is preferably set at less than 10 mm.

To shred the scrap textiles, any variety of cutting or shredding machines may be utilized. For example, the machine used by the inventor contains an enclosed rotating cylinder equipped with a plurality of cutting edges and is capable of adequately shredding industrial quantities of scrap textiles. As one possible alternative, it is noted that the scrap textiles may be cut to length by hand, however, this process is labor intensive, tedious and generally not cost effective.

When shred into short fiber lengths, the fibers have a tendency to intertwine with each other to form fluffy clods of entangled fibers. These are not suitable for use as a cultivation medium and must be further processed to form the smaller, more tightly tangled glomerates which comprise the final product. In this regard, the short fibers are vigorously agitated. Any machine capable of agitating the fibers may be used for this process. Desirable results have been achieved by agitating the fibers in a tank containing a horizontally rotating helical blade capable of agitating industrial quantities of the short fibers. Glomerates are formed due to the property of the fibers to coil and mat together and to so entangle themselves that they become stably entangled.

Since the cultivation medium will typically serve as a hydroponic matrix for cultivating plants, it is important that it constituent glomerates are chemically inert. Scrap textiles from which the glomerates are produced, however, typically contain various dyes and other assorted chemical impurities which may inhibit plant growth. To render the final product chemically inert, the short fibers should be refined and bleached prior to glomeration. This chemical processing is comprised of the following steps:

(1) A 2% solution of refining agent (i.e. an interface active agent), such as $NaHCO_3$, is applied to the fibers at a temperature approximating 70° C. for 20–30 minutes.

(2) The fibers are then treated with an oxide bleaching solution for 30 minutes at a temperature starting at approximately 70° C. and gradually raised to 8° C. The oxide bleaching solution is made by dissolving $NaClO_3$ in ordinary clean water at a concentration of 2 grams per liter, and then mixing that solution with an 0.8 g/l solution of oxalic acid prepared beforehand. It is cautioned that $NaClO_3$ and oxalic acid cannot be mixed together simultaneously without incurring a risk of explosion. The oxalic acid must first be diluted with fresh water.

(3) Sodium hyposulfite is then dissolved in cool water at a concentration of 12.4 grams per liter and then applied to the fibers at a temperature of 40° C. -80° C. for 30 minutes.

After the above chemical processing the material is then thoroughly rinsed with water until the rinse water has a substantially neutral pH. This step is necessary to ensure that the final product will be chemically inert and neutral.

Finally, the material is dried, preferably by first physically squeezing out the water and then placing the material in a conveyor mesh oven.

While the above chemical processing is preferably performed prior to the actual glomeration stage (i.e. at the short fiber stage), it is possible to perform the processing after the short fibers are agitated to form glomerates. In such a case, the chemical processing steps are identical to those outlined above.

Furthermore, aside from the use of scrap textiles made from polyacrylonitrile fibers, the cultivation medium can be manufactured in accordance with the invention from any textiles manufactured from man-made fibers having physical characteristics similar to polyacrylonitrile. For example, due to the physical similarities between polyester fibers and polyacrylonitrile fibers, scrap textiles containing such polyester fibers can be used to manufacture the cultivation medium. Such a medium will generally share the same features and benefits as those manufactured from polyacrylonitrile fibers. Combinations of various man-made fiber textiles can also be used.

B. Features and Uses of the Cultivation Medium

Since the cultivation medium is made from polyacrylonitrile fibers—a synthetic chemical compound prepared through chemical polymerization—its physical structure shows the following qualities: resistance to decay and decomposition, the ability to withstand both acid and alkaline environments, insolubility in water, relative plasticity, germlessness, light weight, softness and fluffiness. Numerous advantages flow from such qualities.

For example, the comparative light weight of the cultivation medium makes it especially suitable for cultivation in infertile natural environments or urban areas. In the urban environment, the light weight of the cultivation medium makes it particularly suitable for cultivating plants in rooftop gardens, terraces, and balconies. Standing in marked contrast to comparatively heavy soil, the light weight of the medium also contributes to its ease of transport and manipulation. Consequently, the back-breaking toil often associated with tilling and preparing farm land is avoided. And, due to its relative stability and its concomitant capacity for long-term utilization, continued usage of the cultivation medium promotes the economization of scarce and costly labor resources.

Another advantage of the cultivation medium is that it is nearly invulnerable to the degradative effects of natural decomposition and rot, and also withstands a broad range of both acidic and alkaline environment. Due to its synthetic composition, the cultivation medium is less susceptible to both bacterial, viral, fungal and insect infestation. Thus, the utilization of the cultivation medium would alleviate the need to use environmentally hazardous fungicides, insecticides or other infestation controlling chemicals.

Although the cultivation medium in itself contains no available sources of plant nutrition, irrigation with a balanced nutrient liquid is easily achieved in accordance with known hydroponic principles. One benefit of providing plants with nutrients hydroponically is that the problems associated with soil depletion and decomposition are avoided. Other costly traditional means of farming, such as crop rotation, are also avoided.

Another quality of the cultivation medium is that it is relatively loose and fluffy, thus promoting good air permeability and excellent drainage. The structure of the cultivation medium also makes possible sufficient capillary action for retaining liquids close to plant roots. Such a quality promotes the growth of prosperous and well-developed plant root systems. And, since the plant roots develop deep within in the medium material, the growth of plants is made much more secure than possible under traditional cultivation methods. Such is an important feature when growing plants of high economic value.

Another important aspect of the cultivation medium is that it is manufactured from scrap textile products. The use of the cultivation medium provides two general interrelated environmental benefits: First, scrap textile fabrics are recycled, and second, the recycled product provides an alternative medium for cultivating plants other than through the use limited land resources.

There are many diverse uses and applications of polyacrylonitrile fibers—i.e. clothing, non-woven cloth, towels, napkins, etc. Unfortunately for the environment, such products are often discarded after they have served their use. Essentially, despite its beneficial uses, polyacrylonitrile products are another source of pollution that is ultimately disposed of in already crowded landfills and garbage dumps. As an effective use of such material, the present cultivation medium represents a positive step forward in the cause of environmental preservation. If the cultivation medium itself is intended to be used for plant cultivation only once, it may used again as an improving compound to change the physical properties of soil.

Although certain preferred embodiments have been described, it should be understood that many changes and modifications may be made therein without departing from the scope of the appended claims.

I claim:

1. A method of manufacturing a synthetic cultivation medium from scrap textiles substantially made of man-made fibers comprising the following steps:
   shredding said scrap textiles into short fibers;
   agitating said short fibers to form glomerates of intertwined fibers; and
   refining said glomerates to render said glomerates substantially environmentally inert.

2. The method as claimed in claim 1, wherein said glomerates are refined by
   treating said glomerates with a dilute aqueous $NaHCO_3$ solution;
   treating said glomerates with a solution containing a dilute aqueous $NaClO_3$ solution and a dilute aqueous oxalic acid solution;
   treating said glomerates with an aqueous sodium hyposulfite solution; and
   rinsing said glomerates with water to obtain a substantially neutral pH.

3. The method as claimed in claim 2, wherein said aqueous $NaHCO_3$ solution has a concentration of 2% w/v.

4. The method as claimed in claim 3, wherein said glomerates are treated with said aqueous $NaHCO_3$ solution for 20–30 minutes at a temperature of approximately 70° C.

5. The method as claimed in claim 2, wherein the said aqueous $NaClO_3$ solution has a concentration 2.0 g/l and said aqueous oxalic acid solution has a concentration of 0.8 g/l.

6. The method as claimed in claim 5, wherein said glomerates are treated with said aqueous NaClO₃ solution and said aqueous oxalic acid solution for approximately 30 minutes at a temperature increasing from approximately 70° C. to 98° C.

7. The method as claimed in claim 2, wherein said aqueous sodium hyposulfite solution has a concentration of 1.2.4 g/l.

8. The method as claimed in claim 7, wherein said glomerates are treated with said aqueous sodium hyposulfite solution for approximately 30 minutes at a temperature of approximately 40° C. to 80° C.

9. The method as claimed in claim 1, wherein said scrap textiles are substantially made of synthetic fibers selected from a group consisting of polyacrylonitrile fibers and polyester fibers.

10. The method as claimed in claim 1, wherein said short fibers are agitated to form glomerates having a diameter from approximately 2 mm to 8 mm.

11. The method as claimed in claim 1, where in said short fibers are approximately less than 10 mm.

* * * * *